(12) United States Patent
Gurndin et al.

(10) Patent No.: US 11,104,357 B2
(45) Date of Patent: Aug. 31, 2021

(54) CABLE CAR CARRIAGE

(71) Applicant: C.D.C. Chain Drive Crane GmbH, Aldino (IT)

(72) Inventors: Helmut Gurndin, Deutschnofen (IT); Alexander Philippov, Moskau (RU)

(73) Assignee: C.D.C. Chain Drive Crane GmbH, Aldino (IT)

( * ) Notice: Subject to any disclaimer, the term of this patent is extended or adjusted under 35 U.S.C. 154(b) by 528 days.

(21) Appl. No.: 15/768,399

(22) PCT Filed: Oct. 11, 2016

(86) PCT No.: PCT/EP2016/074253
§ 371 (c)(1),
(2) Date: Apr. 13, 2018

(87) PCT Pub. No.: WO2017/064014
PCT Pub. Date: Apr. 20, 2017

(65) Prior Publication Data
US 2018/0273054 A1    Sep. 27, 2018

(30) Foreign Application Priority Data
Oct. 15, 2015  (AT) .............................. A 50877/2015

(51) Int. Cl.
*B61B 12/12*   (2006.01)
*B61B 12/00*   (2006.01)
(Continued)

(52) U.S. Cl.
CPC ................ *B61B 12/12* (2013.01); *B61B 7/06* (2013.01); *B61B 12/00* (2013.01); *B61B 12/02* (2013.01);
(Continued)

(58) Field of Classification Search
CPC .. B61B 7/00; B61B 7/06; B61B 12/00; B61B 12/02; B61B 12/12; B61B 12/122; B61B 12/127
See application file for complete search history.

(56) References Cited

U.S. PATENT DOCUMENTS 4,957,047 A  *  9/1990  Feuz ....................... B61B 12/02
                                                         104/204
2016/0031451 A1*  2/2016  Steger ....................... B61B 9/00
                                                         104/89

(Continued)

FOREIGN PATENT DOCUMENTS

AU          546 493         9/1985
CH          588 372         5/1977
(Continued)

OTHER PUBLICATIONS

International Search Report issued by the European Patent Office in International Application PCT/EP2016/074253 dated Dec. 15, 2016.

*Primary Examiner* — Jason C Smith
(74) *Attorney, Agent, or Firm* — Henry M. Feiereisen LLC

(57) ABSTRACT

A cable car carriage for transporting goods or passengers has two opposing spaced-apart crawlers. Each of the crawlers has a crawler chain composed of juxtaposed chain links. A support cable can be inserted between the opposing crawlers on the opposing chain links of the crawler chains. A pressing mechanism connects the crawlers with one another, and is designed to adjust the distance between the crawlers as well as the pressing force of the two crawlers relative to each other and/or the pressing force of the two crawlers against the support cable. The crawler chains are driven in a circulating movement by a drive via a crawler running gear, thus moving the cable car carriage along the support cable. A cable crane, a passenger gondola, a cable saddle, and a (Continued)

transport assembly employing the cable car carriage are also disclosed.

26 Claims, 8 Drawing Sheets

(51) Int. Cl.
  *B61B 7/06* (2006.01)
  *B61B 12/02* (2006.01)
  *F16B 2/10* (2006.01)
  *F16B 2/12* (2006.01)
  *F16F 13/00* (2006.01)

(52) U.S. Cl.
  CPC ................ *F16B 2/10* (2013.01); *F16B 2/12* (2013.01); *F16F 13/00* (2013.01); *F16F 13/002* (2013.01)

(56) References Cited

U.S. PATENT DOCUMENTS

| | | | |
|---|---|---|---|
| 2017/0144675 A1* | 5/2017 | Duer | B61B 12/105 |
| 2018/0273054 A1* | 9/2018 | Gurndin | F16B 2/10 |
| 2018/0304908 A1* | 10/2018 | Sutterluety | B61B 12/122 |

FOREIGN PATENT DOCUMENTS

| | | |
|---|---|---|
| CH | 626 021 | 10/1981 |
| CN | 201 76352 | 1/2009 |
| CN | 203439029 | 2/2014 |
| DE | 202 13 353 | 11/2002 |

\* cited by examiner

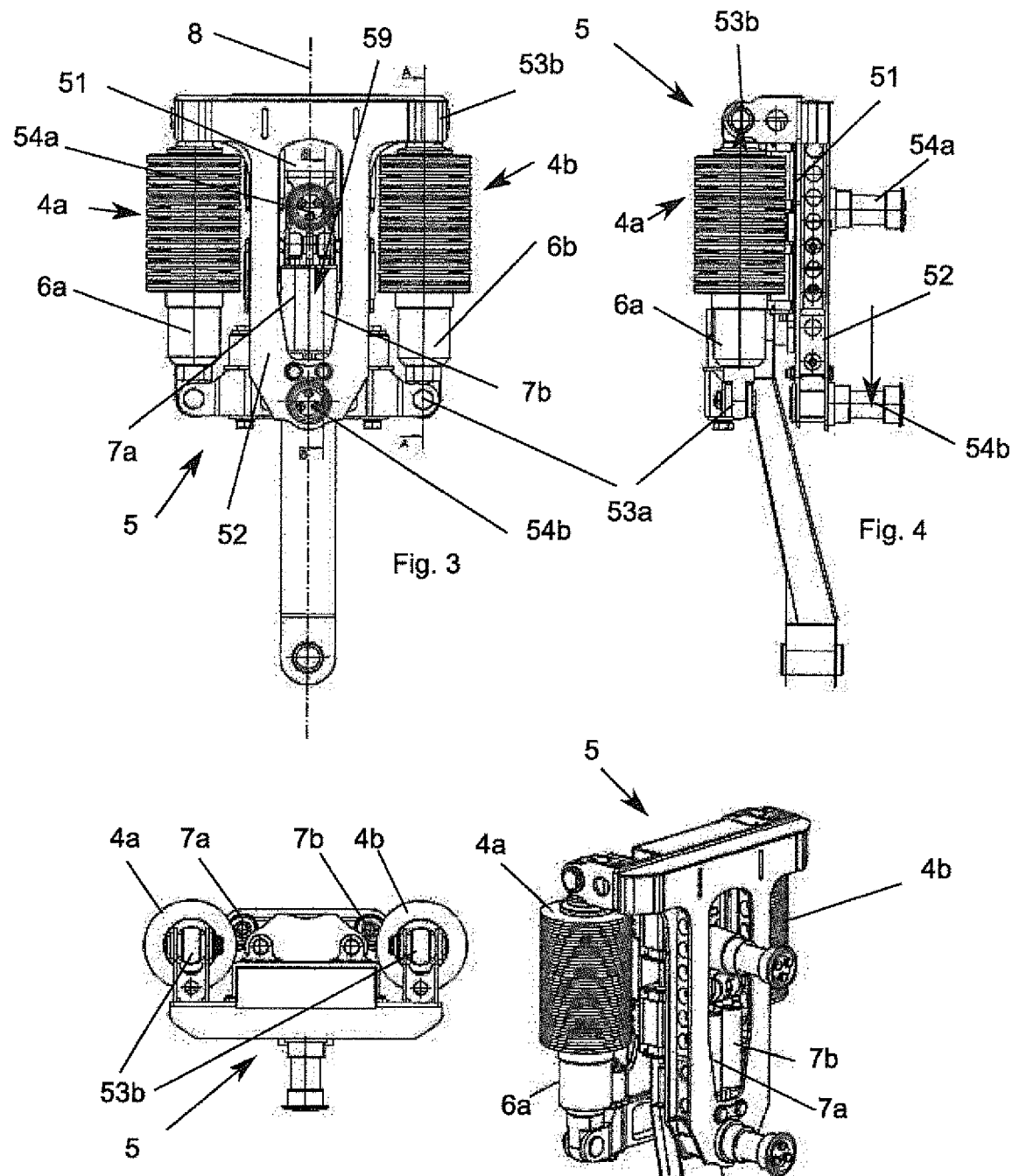

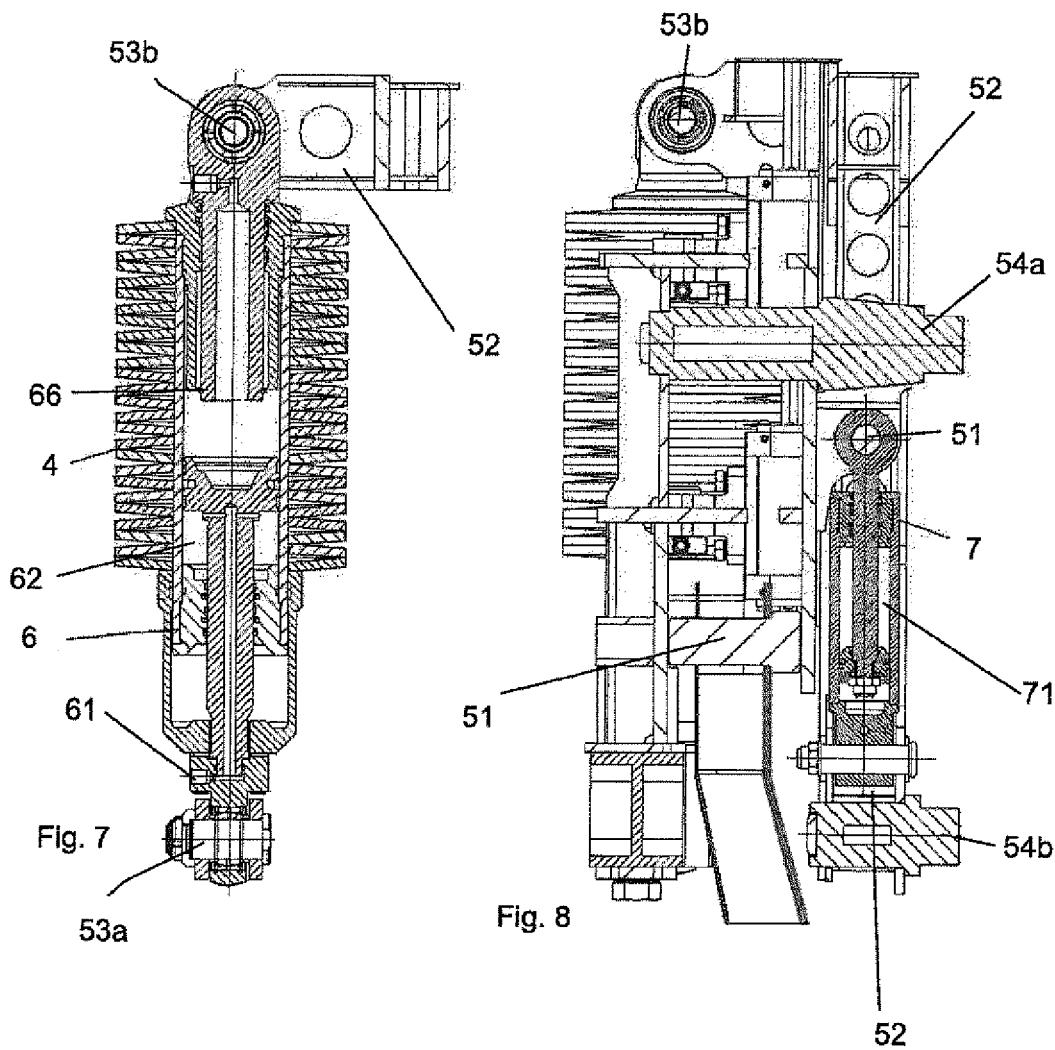
Fig. 7
Fig. 8
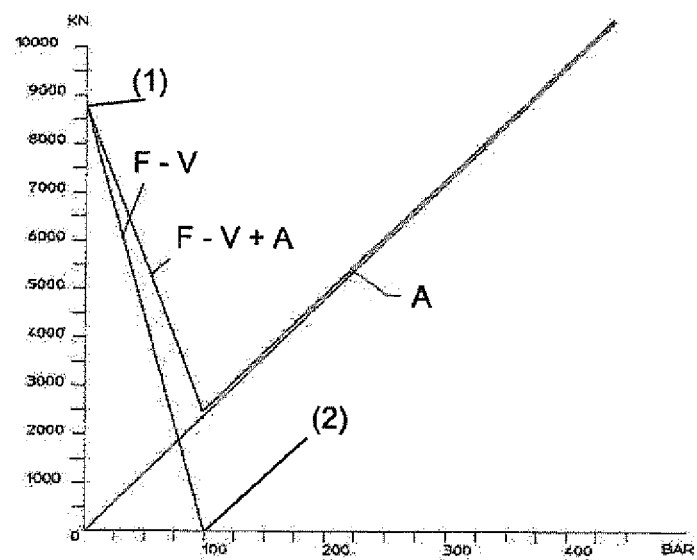
Fig. 9

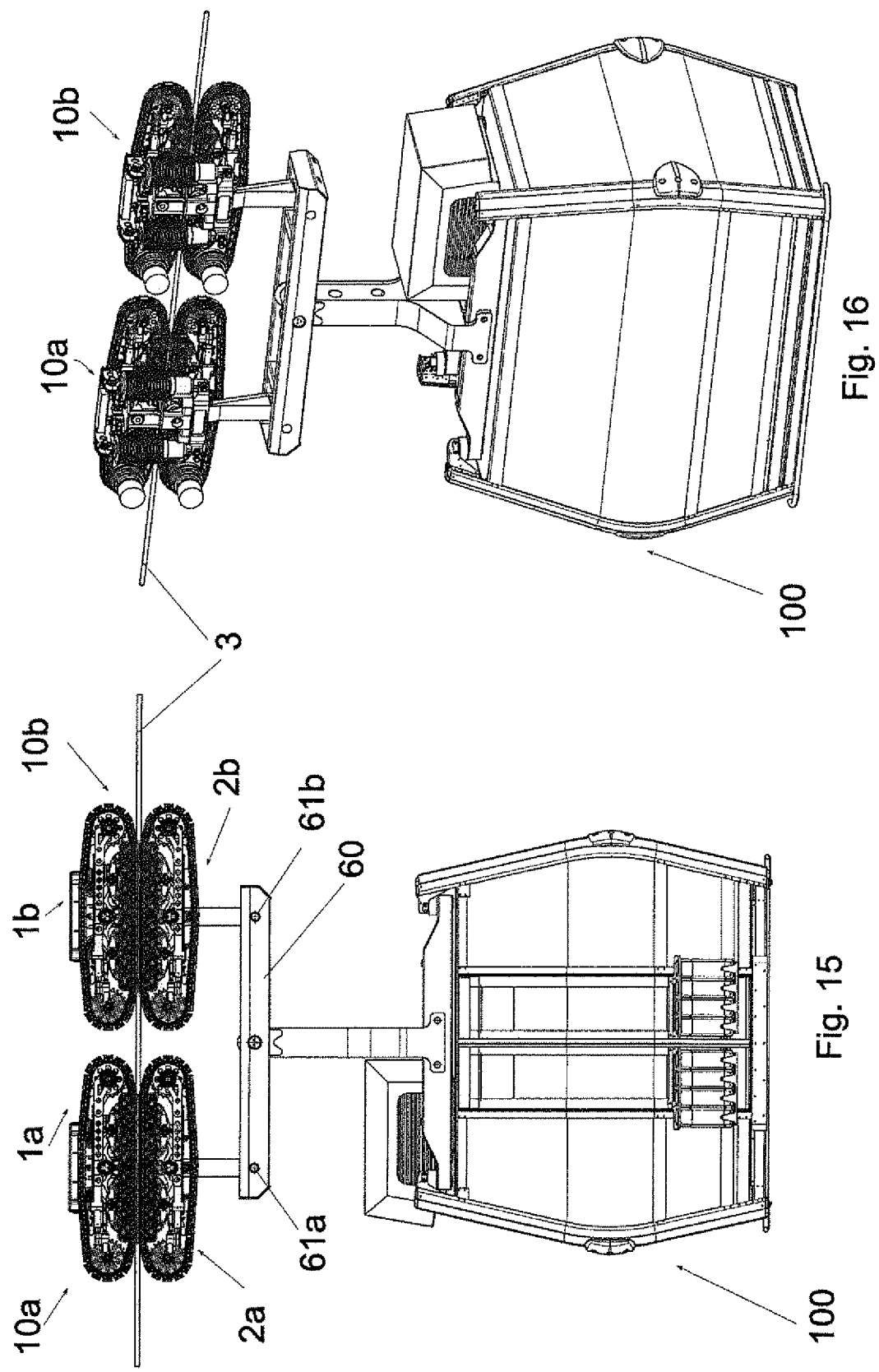

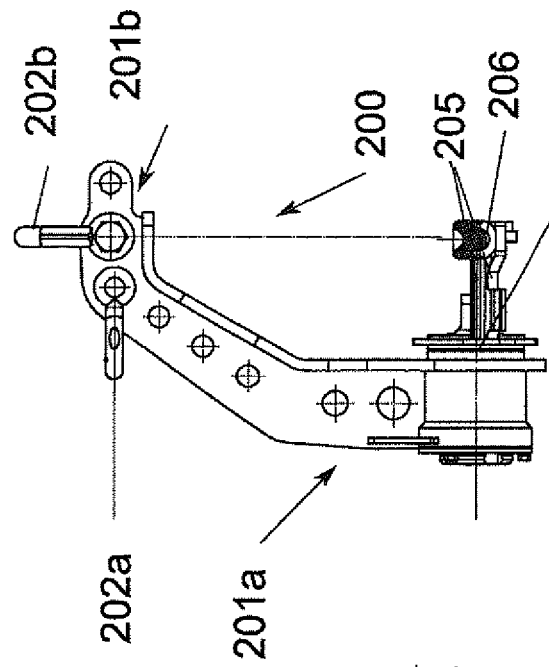
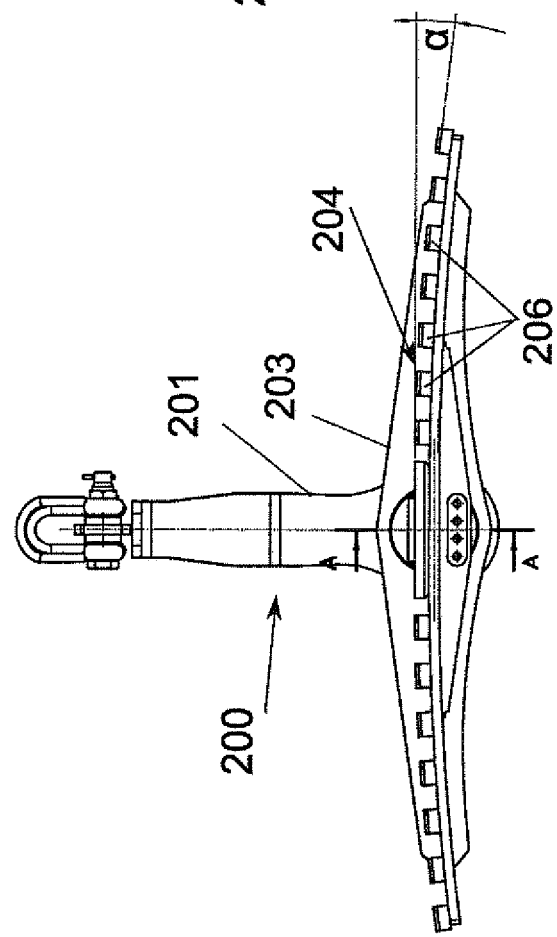
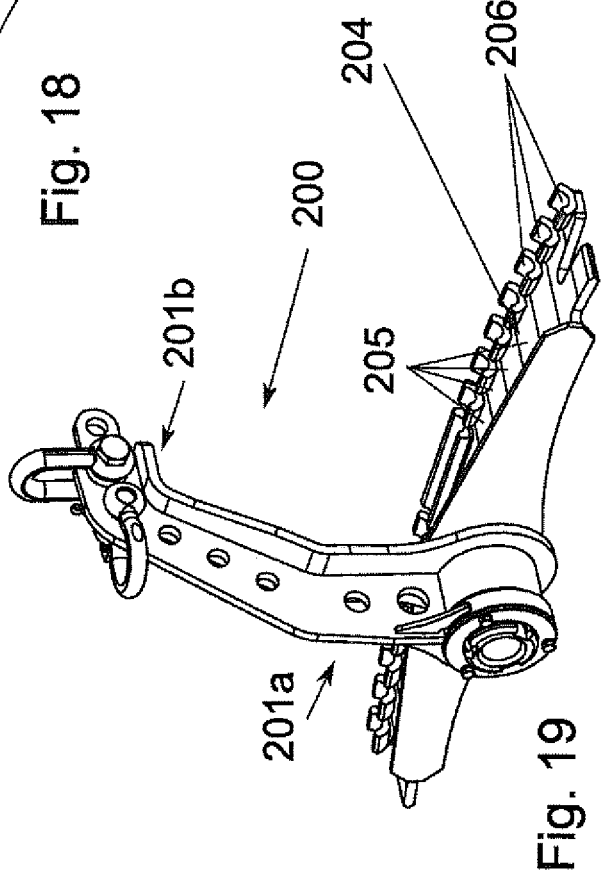

CABLE CAR CARRIAGE

CROSS-REFERENCES TO RELATED APPLICATIONS

This application is the U.S. National Stage of International Application No. PCT/EP2016/074253, filed Oct. 11, 2016, which designated the United States and has been published as International Publication No. WO 2017/064014 and which claims the priority of Austrian Patent Application, Serial No. A50877/2015, filed Oct. 15, 2015, pursuant to 35 U.S.C. 119(a)-(d).

BACKGROUND OF THE INVENTION

The present invention relates to a cable car carriage for transporting goods or passengers, a cable crane for transporting cargo on a support cable, a passenger gondola for transporting passengers on a support cable, a cable saddle which can be traversed by a cable car carriage, and an assembly for transporting goods or passengers along a support cable.

Various devices are known from the prior art which can be used to transport passengers or goods with gondolas along a support cable. Such devices find particular application in the transport of goods and passengers in an alpine setting or along transport routes having a considerable incline. More particularly, gondolas and cable cars are known from the prior art, which are suspended on a support cable and adjusted along the support cable by means of a pull cable.

Furthermore, cable car carriages are known in the prior art which consist of two crawler chains, which rest on a cable and are movably driven along this cable by a motor.

The systems known from the prior art have the disadvantages that on the one hand the gondolas cannot run autonomously due to the adjustment with a pull cable and can no longer be moved, for example, when the pull cable breaks. Furthermore, the known systems have the disadvantage that the motors for moving the gondolas with the pull cable must typically be quite large and are therefore very expensive. Known systems with crawler chains that move along a support cable have the disadvantage that pressing devices may fail so that adhesion on the cable is only poor or nonexistent. Moreover, the structure is very complicated and maintenance-intensive due to the high loads.

It is therefore an object of the present invention to provide a cable car of the aforementioned type, which allows autonomous transport along a support cable.

SUMMARY OF THE INVENTION

According to one aspect of the present invention a pressing mechanism is provided which connects the crawlers with each other, wherein the distance between the crawlers can be adjusted with the pressing mechanism, wherein the pressing force of the two crawlers relative to each other and/or the pressing force of the two crawlers against a support cable is adjustable with the pressing mechanism, wherein the crawler chains are driven by a drive via a crawler running gear in a circular motion and wherein the cable car carriage is adjustable along a support cable.

With the pressing mechanism, the cable car carriage can be moved freely suspended and along various cable types and cable diameters by changing the pressing force. The pressing mechanism acts on the two crawlers that are pressed against each other or against a support cable to ensure sufficient adhesion while at the same time minimizing stress on the components.

Particularly advantageous embodiments of the cable car carriage are further defined by the features of the dependent claims:

According to an advantageous embodiment of the cable car carriage, the pressing mechanism has a first frame part and a second frame part, wherein the first frame part and/or the second frame part are adjustable along a center axis, wherein the first crawler, in particular at a first bearing point, is arranged on the first frame part and the second crawler, in particular at a second bearing point, is arranged on the second frame part, in particular for pivoting with respect to each other.

According to a particularly advantageous embodiment of the cable car carriage, the pressing mechanism includes at least one spring tensioning element which biases the two crawlers toward one another, in particular via the first frame part and the second frame part, and the pressing mechanism includes at least one biasing cylinder which counteracts the force of the spring tensioning element.

With the advantageous assembly of the spring tensioning element with the biasing cylinder, a defined holding force or pressing force can be achieved in the unpressurized state or at standstill. Furthermore, depending on the pressure in the biasing cylinder, the pressing force can be adapted to the respective driving situation, thus achieving gentle loading on the components of the cable car carriage.

The pressing force of the two crawlers against each other or against a support cable can be further improved if the pressing mechanism includes at least one pressure cylinder, with which the crawlers can be pressed against each other with a predetermined pressure, wherein the pressure cylinder is preferably arranged between the first frame part and the second frame part, connecting the first frame part and the second frame part with each other.

Advantageously, the pressure cylinder and the biasing cylinder are each connected to a hydraulic system, in particular to the same hydraulic system with the same supply pressure throughout the entire hydraulic system, wherein the pressure cylinder and the biasing cylinder are designed and arranged such that the pressure cylinder and the biasing cylinder act on the pressing mechanism with an opposing force of identical magnitude, in particular up to a supply pressure of 90 bar, thus canceling each other.

The control of the pressing force as a function of the drive power can advantageously be controlled by controlling the pressure in the biasing cylinder in proportion to the power of the drive, preferably with a pressure regulator, wherein a travel pressure is applied in the biasing cylinder at the beginning of the movement of the cable car carriage along a support cable, wherein the force effect of the biasing cylinder in the presence of the travel pressure, in particular of 90 bar, cancels the force effect of the spring tensioning element.

Advantageously, the force effect of the biasing cylinder is limited, in particular by a mechanical stop or by the maximum stroke of the biasing cylinder, wherein an increase of the force of the biasing cylinder can be prevented in particular in the presence of the travel pressure.

According to an advantageous assembly of the components of the pressing mechanism, the cable car carriage has two spring tensioning elements, two biasing cylinders and two pressure cylinders, which are integrated in particular in the pressing mechanism, wherein preferably the spring biasing elements, the biasing cylinders and the pressure cylinders are each arranged on the cable car carriage symmetrically about the center axis, in particular on a longitudinal side of the crawlers.

The tension of the crawler chains can be adapted particularly advantageously to the requirements of the operating state of the cable car carriage, if each crawler includes at least one tensioning cylinder which tensions the respective crawler chain and is arranged in particular parallel to the opposing chain links of the crawler chains.

The pressure in the cylinders and the force effect of the cylinders or of the pressing mechanism can be particularly easily adjusted and specified when the biasing cylinders, the pressure cylinders and/or the clamping cylinders are oleodynamic hydraulic cylinders and are each connected to a hydraulic system, in particular to the same hydraulic system with the same supply pressure in the entire hydraulic system.

In an advantageous embodiment, the spring tensioning element includes disc springs, which are arranged in particular concentrically around the biasing cylinder.

The control of the pressing force in dependence on the drive power can be further advantageously controlled when the supply pressure of the biasing cylinder, the pressure cylinder and/or the clamping cylinders is controlled in proportion to the power of the drive, wherein in particular the pressure and flowrate in the hydraulic system can be predetermined by the drive and the drive feeds the hydraulic system.

To provide an advantageous autonomous movement of the cable car carriage, the drive of the crawlers may include combustion engines or electric motors.

An advantageous drive of the crawlers provides that each crawler or the crawler chains, respectively, are each driven directly by hydraulic motors, wherein preferably the hydraulic motors are constructed identically and are identically supplied by a hydraulic system.

The adhesion between the chain links and a support cable is advantageously improved when the chain links receive at least a portion of the cross section of the support cable, wherein in particular the chain links of the first crawler receive more than half the cross section of the support cable.

A driverless control of the cable car carriage is achieved by controlling the drive via radio control.

A difference of the drive lines in the crawlers can be particularly well prevented when the biasing cylinder, the pressure cylinder and/or the clamping cylinders are connected to a smart control block, wherein the pressure in the biasing cylinder and/or in the pressure cylinder and/or the clamping cylinders can be changed preferably by way of pressure control valves which are connected to the biasing cylinder and/or the pressure cylinder and/or the clamping cylinders, and when slippage of one or both crawlers or between the crawlers is detected by the control block, the pressure in the biasing cylinder and/or in the pressure cylinder and/or in the clamping cylinders and/or the pressing force applied by the pressing mechanism can be changed. Furthermore, with the intelligent control block, the pressing force or the force of the individual cylinders can be adapted to the driving conditions, thereby effectively preventing slippage between the crawlers or slippage of the crawlers on the support cable.

In order to be able to stop the cable car carriage quickly in an emergency, it is provided that the drive has a brake mechanism with which the drive can be braked, wherein the brake mechanism preferably includes disc springs.

In an advantageous embodiment, each crawler includes a respective drive, wherein the respective drive drives the respective crawler running gear and each drive preferably has a dedicated brake mechanism.

Advantageously, a gondola for transporting passengers and/or cargo is arranged on the cable car carriage, wherein the gondola is articulated in particular on a connecting arm, which is preferably connected to the first frame part of the pressing mechanism.

Furthermore, the crawler systems known from the prior art have the disadvantage that the forces and loads are unevenly distributed in the crawler running gear, which causes an increased loading of the components of the crawler running gear, which thus need to be oversized or replaced more often, or which tend to fail more often.

Another aspect of the present invention is therefore to provide a cable car carriage of the aforementioned type, which allows a uniform load distribution within the crawler running gear.

In accordance with this aspect, at least one crawler running gear has a balance trolley for uniformly distributing the force in the crawler running gear, wherein the balance trolley has a number of balance beams cascaded in a number of stages designed analogous to a beam balance, wherein each balance beam has a central pivot point and two end pivot points which are each arranged at the same distance from the central pivot point, in particular near the end of each balance beam, wherein the central pivot point of the balance beam of the first stage is articulated on the pressing mechanism, in particular about the first bearing point or the second bearing point, wherein the central pivot point of an adjacent balance beam of the next stage is each pivotally arranged at the end pivot points of the balance beams of each stage, wherein the balance beams of the second stage beam are each arranged with their central pivot points at the end pivot points of the first stage, and a respective balance beam of the third stage with its central pivot points is pivoted at the end pivot points of the balance beams of the second stage, etc., wherein several rollers are arranged at the end pivot points of the balance beams of the last stage, wherein the rollers are mounted for rotation about the end pivot points of the balance beams of the final stage, and wherein the rollers can be applied onto at least one chain link of the respective crawler chain.

Due to the design of the balance trolley or the balance beams according to the principle of a beam balance, shocks and bumps acting on the crawler trolley can be absorbed. Furthermore, a pylon or the cable saddle of a pylon can be traversed smoothly.

The distance between the support of the crawler and the chains can advantageously be specified when in each case the end pivot points of the respective balance beam have a distance along the height to the respective central pivot points of the same balance beam, wherein the connecting lines of the end pivot points with the respective central pivot points of a balance beam form an isosceles triangle, wherein in particular the distance of the end pivot points from the central pivot points along the height of each balance beam is the same in the individual stages. This also provides an advantageous force distribution in the balance trolley.

According to a particularly advantageous and preferred embodiment, the balance trolley has balance beams arranged in three stages, wherein the respective end pivot points of the respective balance beams have a distance along the height to the respective central pivot points, wherein the connecting lines of end pivot points with the respective central pivot points form an isosceles triangle.

An advantageous force distribution in the balance trolleys is easily achieved when two respective balance beams are pivotally arranged at each end pivot point of each stage, wherein the respective two balance beams are each arranged symmetrically on one side of the balance beam of the previous stage.

An advantageous cable crane for transporting cargo on a support cable is provided when the cable crane includes at least one, in particular two, such cable car carriages, wherein the cable crane is suspended in particular on two cable car carriages.

An advantageous passenger gondola for transporting persons on a support cable is provided in that the passenger gondola has at least one, in particular two, such cable car carriages, wherein the passenger gondola is suspended, in particular, on two cable car carriages.

According to another aspect of the invention, a particularly suitable cable saddle for the cable car carriage according to the invention is provided. It is contemplated that the cable saddle, which can be traversed by such a cable car carriage, has a suspension and at least one connecting element arranged on the suspension for attachment to a support, characterized in that a cable support for supporting a support cable is arranged on the suspension, wherein the cable support has an elongated cable support surface on which a support cable can be placed, wherein the cable support surface has a number of elastic, sprung sections and wherein the sections are elastically bendable predominantly normal to the cable support surface.

A sprung cable saddle can be provided particularly advantageous when the cable support includes a number of leaf springs, which are arranged side by side, wherein the leaf springs form the cable support surface and are elastically deformable with respect to each other.

Advantageously, the suspension is designed as an L-shaped cantilever arm having a first part and a second part, wherein the first part is longer than the second part, wherein the connecting element is arranged on the second part and the cable support is rotatably mounted on the first part.

In a particularly preferred embodiment of the cable saddle, the cable support surface forms a curved plane.

It is a further object of the invention to provide an assembly which enables easy transport of goods or passengers along a support cable.

In accordance with this aspect, an assembly for transporting goods or persons along a support cable includes a cable saddle which is fastened in particular to the suspension on a pylon, wherein the assembly includes a support cable resting on the cable support surface of the cable saddle, wherein a passenger gondola or a cable crane is affixed on the support cable and/or at least one cable car carriage is arranged on the support cable in such a way that the support cable is inserted between the opposing chain links of the crawler chains.

Further advantages and embodiments of the invention will become apparent from the description and the accompanying drawings.

The invention is illustrated schematically in the following in the drawings with reference to particularly advantageous, but non-limiting exemplary embodiments and will be described by way of example with reference to the drawings.

BRIEF DESCRIPTION OF THE DRAWING

FIGS. 3 to 6 show an embodiment of the pressing mechanism of the cable car carriage in plan view, in elevation and in cross section as well as in a perspective view, FIG. 7 shows a cross section through the biasing cylinder of an embodiment of the pressing mechanism, FIG. 8 shows a cross section of an embodiment of the pressing mechanism, FIG. 9 shows a diagram of the force of an embodiment of the pressing mechanism of the cable car carriage, FIGS. 15 and 16 and 17 show in a frontal and a perspective view an embodiment of a passenger gondola with an embodiment of two cable car carriages, and FIGS. 17 to 19 show in a frontal and cross-sectional view and in a perspective view a cable saddle according to the invention.

DETAILED DESCRIPTION OF PREFERRED EMBODIMENTS

Figure 1:
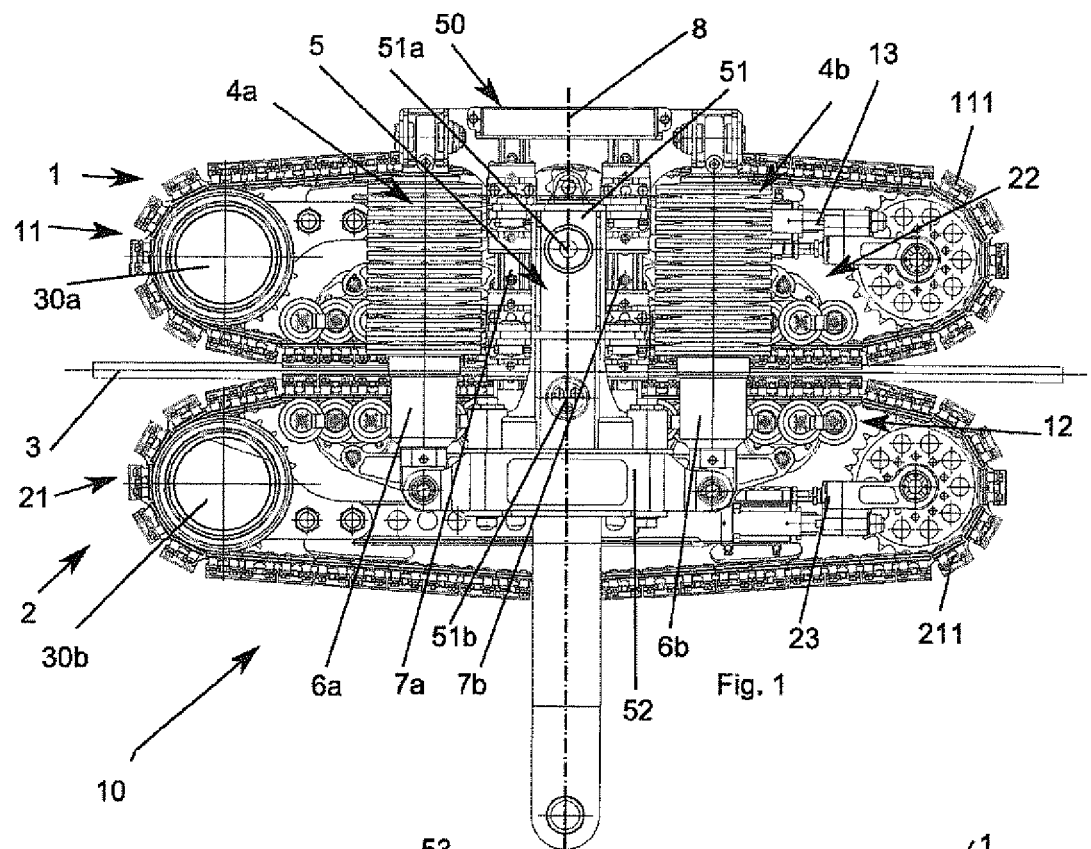
FIG. 1 shows in a frontal view a first embodiment of the cable car carriage according to the invention with a pressing mechanism.

FIG. 1 shows in a frontal view an embodiment of the cable car carriage 10 according to the invention for transporting goods or passengers. The cable car carriage 10 includes two opposing crawlers 1, 2 arranged one above the other in a plane, wherein each of the crawlers 1, 2 has a crawler chain 11, 21. A number of chain links 111, 211 each forms the closed crawler chain 11, 21 of the crawlers 1, 2. The crawler chains 11, 21 are arranged in opposition at a distance from each other, and a support cable 3 is inserted between the two crawlers 1, 2 in the crawler chains 11, 21 and the chain links 111, 211, respectively. The chain links 111, 211 each receive part of the cross section of the support cable 3. The chain links 111 of the first crawler 1 accommodate in this embodiment more than half the cross section of the support cable 3 and extend over the center plane of the support cable 3 in the direction of the chain links 211 of the second crawler 2. The chain links 211 of the second crawler 2 also accommodate part of the cross section of the support cable 3, this part being less than half the cross section.

The cable car 10 further includes a pressing mechanism 5, which connects the crawlers 1, 2 with each other, presets or adjusts the distance between the two crawlers 1, 2, and sets the pressing force of the two crawlers 1, 2 against the support cable 3 or with respect to each other. The cable car carriage 10 includes a drive 30 which drives the respective crawlers 1, 2 via a crawler running gear 12 or 22 and moves or displaces the crawlers 1, 2 and the cable car carriage 10, respectively, along the support cable 3. In this embodiment, the drive 30 is designed in two parts, with each crawler 1, 2 having a respective sub-drive 30a and 30b. The sub-drive 30a of the first crawler 1 or the sub-drive 30b of the second crawler 2, respectively, drives the respective crawler chain 11 and 21 via a pinion which engages in the chain links 111 or 211. In this embodiment, the pressing mechanism 5 includes two biasing cylinders 6a, 6b, which are arranged next to the crawlers 1, 2 symmetrically to the center axis 8, which is perpendicular to the support cable 3. A respective spring tensioning element 4a, 4b is arranged around each of the biasing cylinders 6a, 6b, which is formed in this embodiment as a disc spring package. The pressing mechanism 5 includes a frame 50 having a first frame part 51 and a second frame part 52, which are adjustable relative to one another along the center axis 8. The first crawler 1 is mounted in a first bearing 51 on the first frame part 51 of the frame 50. The second crawler 2 is mounted in a second bearing 51b on the second frame part 52a of the frame 50. The bearings 51a, 51b of the crawlers 1, 2 are formed according to a swivel joint, wherein the crawlers 1, 2 are each independently rotatable or pivotable about the respective bearing 51a and 51b. The pressing mechanism 5 defines the distance between the first crawler 1 and the second crawler 2 and between the bearings 51a and 51b of the frame 50. The pressing mechanism 5 applies a force along the center axis 8 on the crawlers 1, 2 or between the first frame part 51 and the second frame part 52. The distance between the first crawler 1 and the second crawler 2, as well as the pressure of the two crawlers 1, 2 against each other along the center axis 8 and the pressure of the crawlers 1, 2 against the support cable 3 are hereby predetermined.

Figure 2:
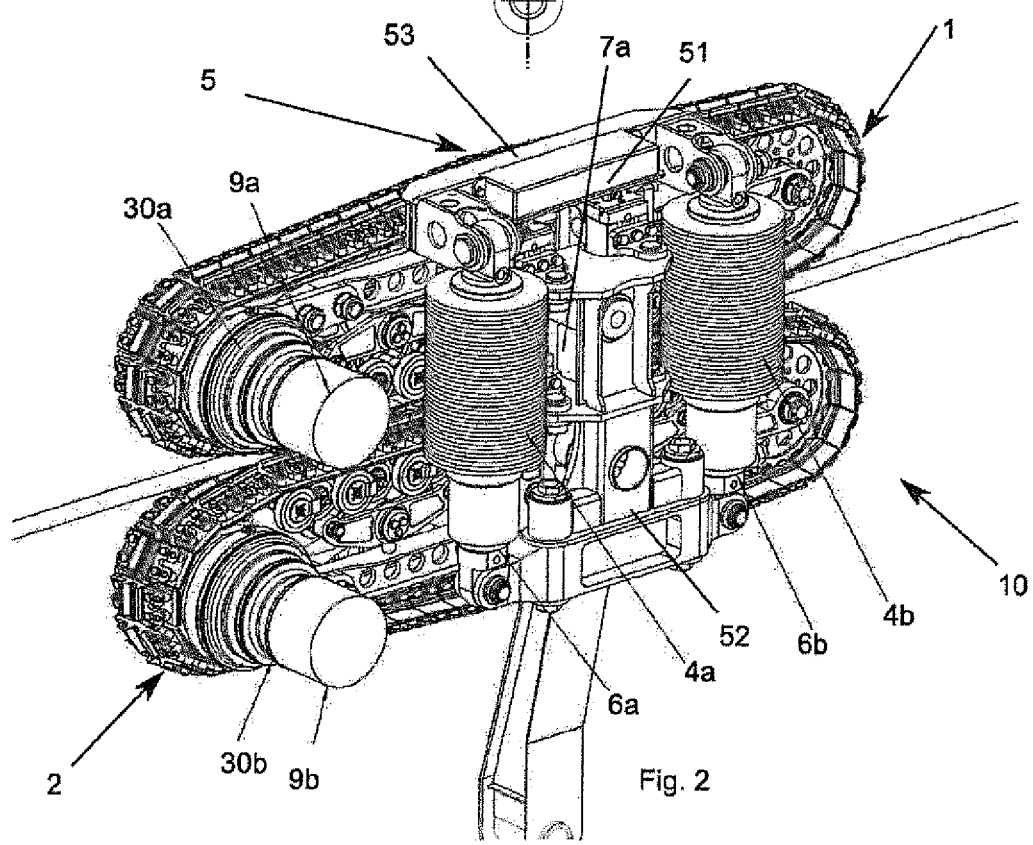
FIG. 2 shows a second embodiment of the cable car carriage in a perspective view.

FIG. 2 shows a perspective view of an embodiment of the cable car carriage 10. The spring tensioning elements 4a, 4b are designed as disc springs and cause a force effect of the first frame part 51 to the second frame part 52 of the frame 50. The disc springs of the spring tensioning elements 4a, 4b act as compression springs and cause the first crawler 1 to approach or be compressed against the second crawler 2 when the distance between the disc springs increases or the pressing force is applied to an arm 53 which is attached to the first frame part 51 of the frame 50. The biasing cylinders 6a and 6b have the same effective axis as the spring tensioning elements 4a, 4b, whereas the force of the biasing cylinders 6a, 6b is produced in opposition to the force of the spring biasing elements 4a, 4b. With increasing force the biasing cylinders 6a, 6b thus cancel in a stepwise manner the pressing force exerted on the crawlers 1, 2 by the spring tensioning elements 4a, 4b.

The function of the embodiments of the pressing mechanism 5 of FIG. 1 and FIG. 2 is hereby performed as follows:

At standstill, the full pressing force of the spring tensioning elements 4a, 4b acts on the first crawler 1 and on the second crawler 2, whereby these crawlers are maximally compressed and a holding force is exerted on the cable 3. When starting the cable car carriage 10, the force of the biasing cylinders 6a, 6b is increased, thus reducing the total pressing force between the first crawler 1 and the second crawler 2, which enables or facilitates the drive 30 or the two sub-drives 30a, 30b to move the cable car carriage 10 along the support cable 3. As the travel speed increases, the pressing force is reduced by increasing the pressure in the biasing cylinders 6a, 6b, thus allowing an increased travel speed and/or reducing friction.

FIGS. 3 to 6 show a preferred embodiment of the pressing mechanism 5 in a frontal (FIG. 3), cross-sectional (FIG. 4), plan view (FIG. 5) and perspective view (FIG. 6). The frame 50 of the pressing mechanism 5 is in this embodiment also designed in two parts, wherein the pressing mechanism 5 includes a first frame part 51 and a second frame part 52. The distance between the second frame part 52 and the first frame part 51 is adjustable along the center axis 8, with the second frame part 52 sliding on the first frame part 51. A first bearing pin 54a is arranged on the first frame part 51 and a second bearing pin 54b is arranged on the second frame part 52. The first bearing pin 54a passes through a recess 59 in the second frame part 52. The first crawler 1 is connected to the frame 50 at a bearing 51a via the first bearing pin 54a and the second crawler 2 is arranged on the second frame part 52 at the second bearing 51b via the second bearing pin 54b. The embodiment of FIGS. 3 to 6 has spring tensioning elements 4a, 4b arranged symmetrically about the center axis 8 and biasing cylinders 6a, 6b arranged concentric with the spring tensioning elements 4a, 4b. The biasing cylinders 6a, 6b and the spring elements 4a and 4b are each hinged to the respective first frame member 51 and the second frame member 52 of the frame 50, with each of the biasing cylinders 6a, 6b connecting the first frame member 51 to the second frame member 52. One end of the respective biasing cylinder 6a, 6b is articulated on an articulation point 53a of the first part 51 and the other end of the respective biasing cylinder 6a, 6b is articulated on an articulation point 53b of the second part 52. When the distance between the disc springs of the spring element 4a and 4b increases, the second frame part 52 is displaced relative to the first frame part 51 of the frame 50 along the center axis 8, thereby increasing the distance between the second frame part 52 and the first frame part 51 or the bearing pin 54a or 54b. The first frame part 51 is hereby supported in the frame 50 and can perform a translational movement relative to the second frame part 52. The force effect of the biasing cylinders 6a, 6b opposes the force effect of the spring tensioning elements 4a, 4b, thereby canceling the force effect depending on the application of the pressure in the biasing cylinders 6a, 6b.

FIG. 4 shows the resulting force action or the motion action of the biasing cylinders 6a and 6b with the spring elements 4a, 4b on the frame 50. Due to the frame 50, application of a resultant pressing force at the first articulation point 53b of the second frame part 52 causes the bearing pins 54a and 54b to move closer to each other via the linkage of the biasing cylinders 6a, 6b between the first frame part 51 and the second frame part 52 of the frame 50.

In the embodiment shown in FIGS. 3 to 6, the pressing mechanism 5 has in addition two pressure cylinders 7a, 7b. The pressure cylinders 7a, 7b are arranged symmetrically with respect to the center axis 8 and are articulated between the first frame part 51 and the second frame part 52 of the frame 50. The pressure cylinders 7a, 7b thereby cause a force action along the center axis 8. The pressing mechanism 5 includes a force limiter which limits the force of the biasing cylinders 6a, 6b. The force limiter of the biasing cylinders 6a, 6b can be designed as a stop or as a maximum piston travel of the biasing cylinders 6a, 6b. The force limiter of the biasing cylinders 6a, 6b causes a maximum force action of the two biasing cylinders 6a, 6b, which corresponds to the maximum force of the spring elements 4a, 4b. The biasing cylinders 6a, 6b and the pressure cylinders 7a, 7b may be designed as oleo-dynamic hydraulic cylinders and be supplied via a hydraulic system with a supply pressure. The change in the supply pressure in the hydraulic system causes a change in the force of the biasing cylinders 6a, 6b and the pressure cylinder 7a, 7b, respectively.

In a preferred embodiment, the pressure in the biasing cylinders 6a, 6b is controlled in proportion to the power of the drive 30, wherein a travel pressure is applied to the biasing cylinders 6a, 6b at the beginning of the movement of the cable car carriage 10 along the support cable 3. When the travel pressure is present in the biasing cylinders 6a, 6b, the force of the spring elements 4a, 4b is canceled, which also cancels the pressing force between the two crawlers 1, 2. Advantageously, the pressing mechanism 5 may have a force limiter for the force action of the biasing cylinders 6a, 6b, with the force limiter preventing an increase in the force of the biasing cylinders 6a, 6b above the travel pressure when the supply pressure increases. This can be achieved for example via a stop or by designing the biasing cylinders 6a, 6b with a maximum piston stroke.

The force of the pressure cylinders 7a, 7b operates in opposition of the force of the biasing cylinders 6a, 6b and in the same direction as the force of the spring tensioning elements 4a, 4b, whereby the second frame member 52 moves closer to or reduces the distance relative to the first frame member 51 when the supply pressure in the pressure cylinders 7a, 7b increases, or when the pressing force between the crawlers 1, 2 is increased. FIG. 7 shows a cross section through the biasing cylinder 6 of an embodiment of the pressing mechanism 5 according to the invention. The spring tensioning element 4 is arranged concentrically with the axis of the biasing cylinder 6 around a frame part of the outer surface of the biasing cylinder 6. The forces of the biasing cylinder 6 and of the spring tensioning element 4 operate in opposite directions, similar to the embodiments described in FIGS. 1 to 6. The spring tensioning element 4 causes a force action along the axis of the biasing cylinder 6, thereby increasing the distance between the articulation 53a of the first frame part 51 and the articulation 53b of the second frame part 52. Oil enters the oil chamber 62 in the biasing cylinder 6 designed as an oleo-dynamic hydraulic cylinder via the inlet opening 61, with the biasing cylinder 6 causing a force action against the force of the spring clamp element 4 along the axis of the biasing cylinder 6, thereby reducing the distance between the articulation point 53a of the first frame part 51 and the articulation point 53b of the second frame part 52. The force effect of the spring tensioning element 4 is thus gradually reduced when the supply pressure in the biasing cylinder 6 increases and the resulting force action between the first frame part 51 and the second frame part 52 of the frame 50 or of the pressing mechanism 5 is reduced. As a result of an embodiment of the pressing mechanism 5, as shown in FIGS. 1 to 2 or FIGS. 3 to 6, the force effect of the pressing mechanism 5 or of the crawlers 1 and 2 relative to one another or against the support cable 3 can thus be changed. The maximum force of the biasing cylinder 6 is limited by limiting the travel of the biasing cylinder 6 by a stop 66, as shown in FIG. 7.

FIG. 8 shows a cross-sectional view along the axis of a pressure cylinder 7. The pressure cylinder 7 is arranged between the first frame part 51 and the second frame part 52 of the frame 50 of the pressing mechanism 5. An increase of the supply pressure in the oil chamber 71 of the biasing cylinder 7 designed as an oleo-dynamic hydraulic cylinder causes the piston of the biasing cylinder 7 to retract, thereby reducing the distance between the bearing pins 54a, 54b and increasing the force between the bearing pins 54a, 54b.

The biasing cylinder 6 shown in FIG. 7 can advantageously be used in the embodiments of FIGS. 1 and 2 and 3 to 6, respectively, of the pressing mechanism 5 and particularly advantageously combined with the biasing cylinder 7 of FIG. 8 or with two biasing cylinders 7a, 7b, as illustrated in FIGS. 3 to 6.

FIG. 9 shows a diagram of the force effect of an embodiment of the cable car carriage 10 with the pressing mechanism 5 according to the invention. The pressing mechanism 5 includes at least one biasing cylinder 6, a spring tensioning element 4 and a pressure cylinder 7 arranged according to FIG. 8. The y-coordinate of the diagram shows in form of an example the force action of the individual parts of the pressing mechanism, with the x-axis depicting the supply pressure of the biasing cylinder 6 and of the pressure cylinders 7. Starting from the maximum force effect of the spring tensioning element 4 (see point (1)), the force F of the spring tensioning element 4 is reduced by the force V of the biasing cylinder 6 when the supply pressure is increased, while at the same time the force A of the pressure cylinders 7 increases. By increasing the supply pressure in the biasing cylinder 6 and the pressure cylinder 7, the force F−V+A of the pressing mechanism 5 is reduced until the force F of the spring tensioning element 4 is completely canceled (2) by the force V of the biasing cylinder 6 and only the force A of the pressure cylinders 7 acts against the pressing mechanism 5. Upon further increase of the supply pressure in the pressure cylinder 7, the pressing force of the two crawlers 1, 2 with respect to each other or the pressing force of the pressing mechanism 5 is further increased. The cancellation of the force F of the spring tensioning element 4 by the force V of the biasing cylinder 6 is preferably achieved at a travel pressure of about 90 bar. The travel pressure is present in the supply system when the cable car carriage 10 is set in motion by the drive 30 and the cable car carriage 10 begins to move along the support cable 3. As a result of the cancellation of the force F of the spring tensioning element 4 by the force V of the biasing cylinder 6 at the begin of the travel of the cable car carriage 10, an optimal force effect of the pressing mechanism 5 and an optimal pressing force between the first crawler 1 and the second crawler 2 are achieved, resulting in protection of the components of the cable car carriage 10 while simultaneously generating an optimum pressing force.

The pressure cylinder 7 and the pressure cylinders 7a, 7b of the biasing cylinder 6 and of the biasing cylinder 6a, 6b, respectively, may in the embodiments shown in FIGS. 1 to 8 be formed as oleo-dynamic hydraulic cylinders and each connected to a hydraulic system, with the cylinders being connected in particular to the same hydraulic system having the same supply pressure or the same supply state throughout the entire hydraulic system. Furthermore, the hydraulic system can be controlled in proportion to the drive power of the drive 30 by pressure valves or by an intelligent control block.

The supply pressure of the tension cylinder 6 and the biasing cylinders 6a, 6b of the pressure cylinders 7 and the pressure cylinders 7a, 7b, respectively, can be controlled in proportion to the power of the drive 30, wherein the pressure and the flow in the hydraulic system are predetermined by the drive 30, wherein the drive 30 in particular feeds the hydraulic system and thus a supply pressure or flow in the hydraulic cylinders can be achieved that increases with the drive power of the drive 30.

Alternatively, the cable car carriage 10 according to the invention may also include a brake mechanism. 9, which is integrated, for example, in the drive 30. The brake mechanism 9 can be designed as an emergency brake mechanism and brake the drive 30 in event of a failure of the drive or of individual parts of the crawlers 1, 2, thereby bringing the cable car 10 to a halt.

FIGS. 1 and 2 show a possible embodiment of the brake mechanism 9. The respective drives 30a, 30b of the crawlers 1, 2 can be augmented with a brake mechanism 9a and brake mechanism 9b, respectively. The brake mechanisms 9a or 9b may include disc springs, which cause a braking effect on the respective drive 30a, 30b.

Figure 10:
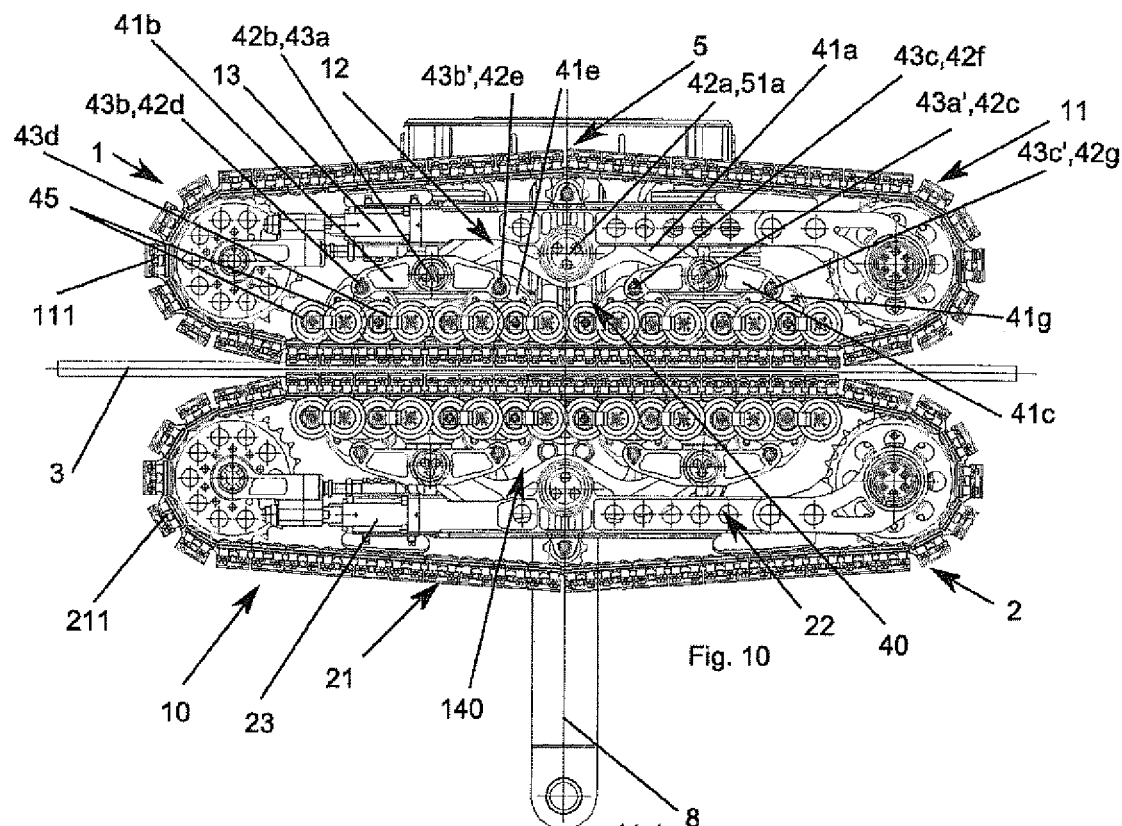
FIG. 10 shows in a frontal view another embodiment of the cable car carriage according to the invention with a balance trolley.
Figure 11:
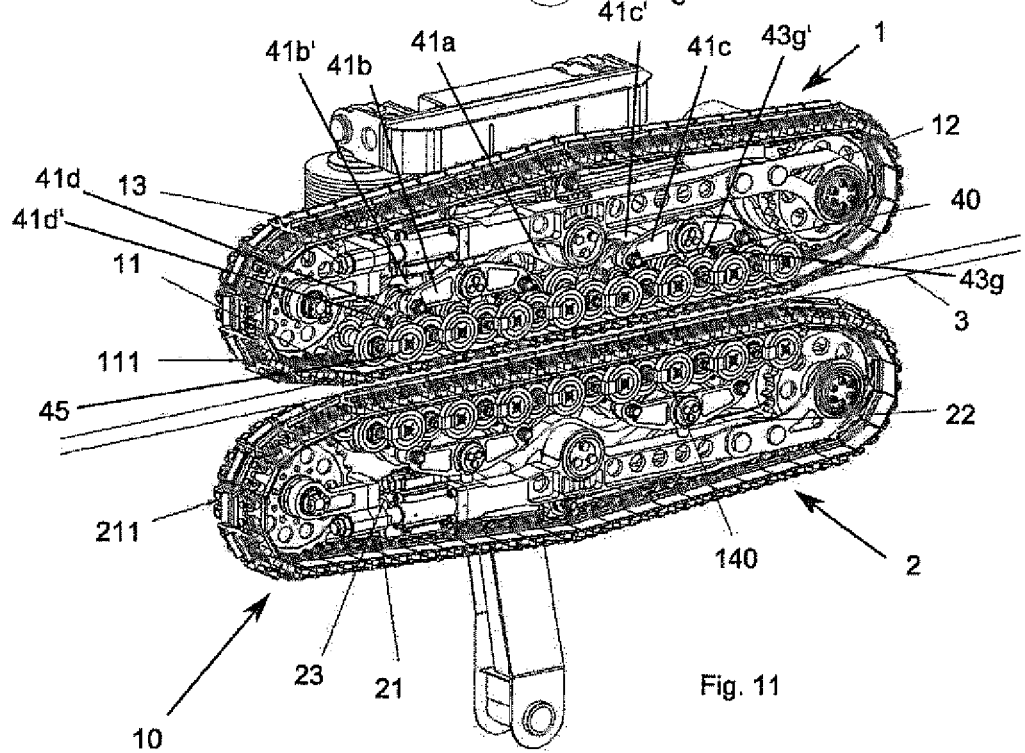
FIG. 11 shows in a perspective view another embodiment of the cable car carriage with a balance trolley.
Figure 12:
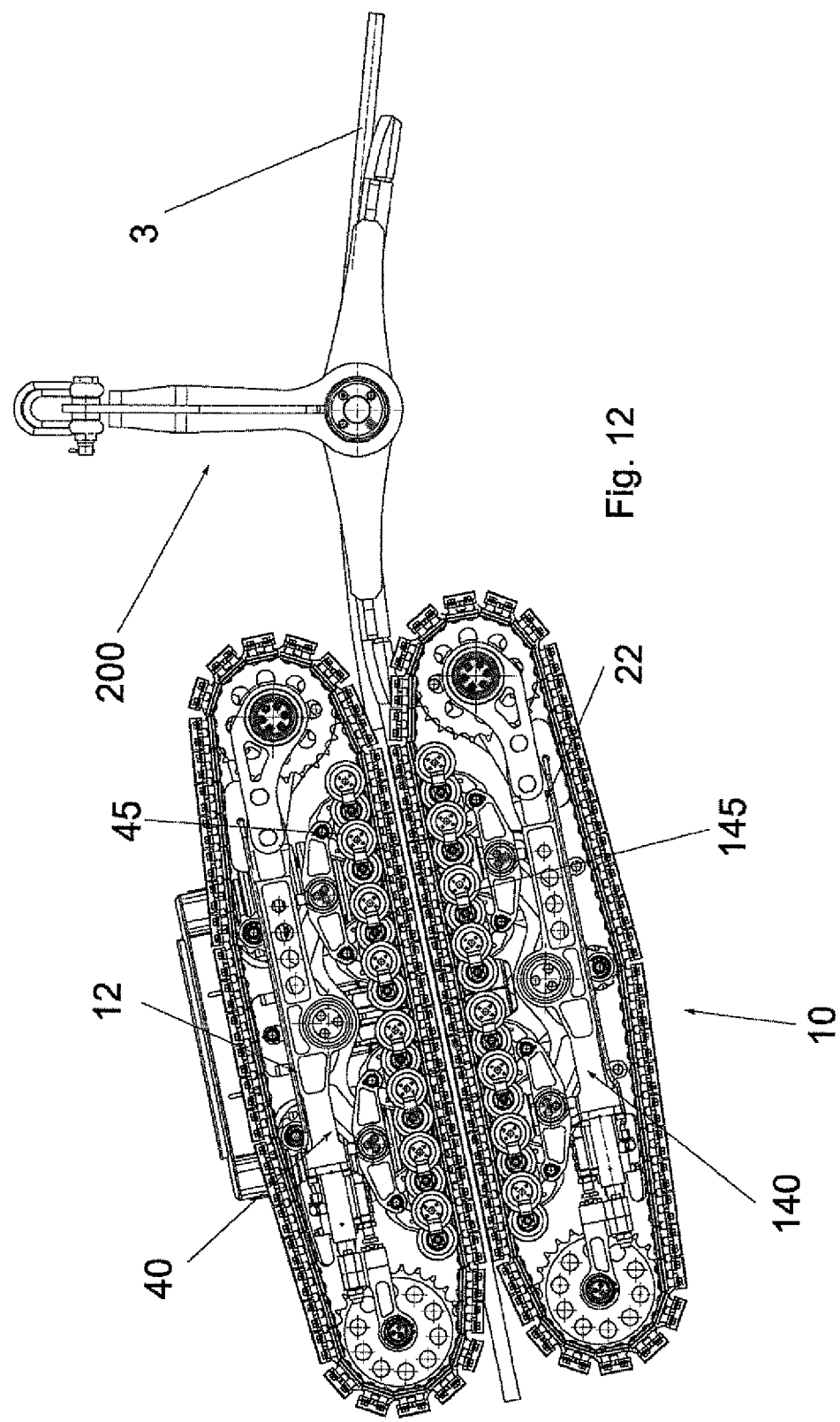
FIG. 12 shows an embodiment of the cable car carriage when driving onto a cable saddle.

The following FIGS. 10 to 12 show a particularly advantageous, but not limiting embodiment of a cable car carriage 10 according to the invention with a balance running gear 40. The cable car carriage 10 includes a pressing mechanism 5 and two crawlers 1, 2 arranged congruently on top of one another in a plane. The crawler chains 11, 21 of the crawlers 1, 2 are formed by a plurality of chain links 111, 211 arranged next to one another. The crawler chains 11, 21 are each driven by an unillustrated drive 30 via a crawler running gear 12, 22. The crawler running gears 12, 22 of the crawlers 1, 2 are formed as balance trolley 40. The balance trolley 40 enables a uniform force distribution within the respective crawler running gears 12, 22.

In a cable car carriage 10 according to the invention, a balance trolley 40 for uniform force distribution in the crawler running gear includes several balance beams 41a to 41n cascaded in a number of stages. The balance beams 41a to 41n are formed analogous to a beam balance, with each balancing beam 41a to 41n having a central pivot point 42a to 42n and two end pivot points 43a to 43n, 43a' to 43n' each arranged at the same distance from the central pivot point 42a to 42n. The end pivot points 43a to 43n and 43a' to 43n'' of the respective balance beams 41a to 41n have along the height a distance to the respective central pivots 42a to 42n of the same balance beam 41a to 41n. The imaginary connecting lines of the end pivot points 43a to 43n and 43a' to 43n' with the respective central pivot points 42a to 42n of a balance beam 41a to 41n form an isosceles triangle. The distance of the end pivot points 43a to 43n and 43a' to 43n' from the central pivot points 42a to 42n along the height of each balance beam 41a to 41n may be the same in the individual stages, but may also vary from stage to stage. The central pivot point 42a of the first balance beam 41a of the first stage is articulated on the pressing mechanism 5, for example on the first bearing location 51a or the second bearing location 51b. In each case, the central pivot point 42a to 42n of an adjacent balance beam 41b to 41n of the next stage is pivotally mounted at the end pivot points 43a to 43n, 43a' to 43n' of the balance beams 41a to 41n of each stage. Thus, the balance beams 41b, 41c of the second stage are each arranged with their central pivot points 42b, 42c at the end pivot points 43a, 43a' of the balance beam 41a of the first stage. A respective balance beam 41d, 41e, 41f, 41g of the third stage with their central pivot points 42d, 42e, 42f, 42g is in each case articulated at the end pivot points 43b, 43b' and 43c, 43c' of the balance beams 41b, 41c of the second stage, etc.

Several rollers 45 are arranged at the end pivot points 43x to 43n, and 43x' to 43n' of the balance beams 41x to 41n of the last stage, wherein the rollers 45 are mounted for rotation around the end pivot points 43x to 43n, and 43x' to 43n' of the balance beams 41x to 41n of the last stage. The rollers 45 then rest against the respective crawler chain 11, 21 on at least one chain link 111, 211.

FIGS. 10 and 11 show a particularly advantageous embodiment of the cable car carriage 10 with a preferred balance trolley 40, 140 integrated in each crawler 1, 2. The balance trolley 40 includes a number of balance beams 41a to 41g cascaded in three stages. The balance beams 41a to 41n are formed analogous to a beam balance. Each balance beam 41a to 41n includes a central pivot point 42a to 42g, which is in each case arranged in the center of the respective balance beam 41a to 41n. Two end pivot points 43a to 43g and 43a' to 43g' are each arranged at the same distance from the central pivot point 42a to 42g of the respective balance beam 41a to 41g. The end pivot points 43a to 43g and 43a' to 43g' are each disposed near the end of the respective balance beam 41a to 41g. The balance beam 41a is articulated with the central pivot point 42a on the pressing mechanism 5, in this embodiment at a first bearing location 51a at a swivel point. The first balance beam 41b of the second stage is disposed at the first end pivot point 43a of the first balance beam 41a of the first stage, with the center pivot point 42b of the first balance beam 41b of the second stage being articulated or rotatable on the first end pivot point 43a of the first balance beam 41a of the first stage in a swivel joint. The second balance beam 41c of the second stage is arranged at the second end pivot point 43a' of the first beam 41a of the first stage, with the second balance beam 41c of the second stage being pivotally or rotatable mounted with the central pivot point 42c at the end pivot point 43a' of the first balance beam 41a of the first stage. The four balance beams 41d to 41g of the third stage are each articulated with their central pivot points 42d to 42g at a respective end pivot point 43b, 43b' of the first balance beam 41b of the second stage or at an end pivot point 43c, 43c' of the second balance beam 41c of the second stage. A number of rollers 45, which rest against at least one chain link 111 of the crawler chain 11, are in each case arranged at respective end pivot points 43d to 43g or 43d' to 43g' of the balance beams 41d to 41g of the third stage. The balance trolley 40 is arranged symmetrically about the center axis 8 of the pressing mechanism 5. The end pivot points 43a to 43g and 43a' to 43g' of the respective balance beams 41a to 41g are each spaced apart from the respective central pivot points 42a to 42g along the height of the respective balance beam 41a to 41g or are spaced apart in the direction of the center axis 8 of the pressing mechanism 5. The end pivot points 43a to 43g and 43a' to 43g' of the respective balance beams 41a to 41g or their connecting lines are arranged in an isosceles triangle. The spacing between the respective end pivot points 43a to 43a' and the central pivot points 42a to 42g in the direction of the height effects the spacing between the rollers 45 and the central pivot point 42a of the first balance beam 41a of the first stage as well as the spacing between the first bearing location 51a and the chain links 111 or the support cable 3. The assembly of the balance beam 41a to 41g according to the principle a beam balance results in uniform weight and force distribution over all rollers 45. The rotatably arranged central pivot points 42a to 42g of the balance beams 41a to 41g allow a compensating movement of the rollers 45 and the chain links 111 along a support cable 3, whereby buckling or widening or changes in the spacing between the crawlers 1, 2 can be compensated without causing jerking. The embodiment shown in FIG. 10, the crawler 2 also has a balance trolley 140 with three stages constructed similar to the first crawler 1.

FIG. 11 shows another preferred embodiment of a cable car carriage 10 with balance trolleys 40, 140 integrated in the first crawler 1 and the second crawler 2. In this embodiment of the balance trolley 40, 140, the respective balance beams 41a to 41g of the second and third stages are arranged symmetrically about the center axis of the first balance beam 41a of the first stage. The symmetrical assembly of the balance beams 41b to 41g or 41b' to 41g' is formed mirror-symmetric about the center axis of the balance beam 41a. Four rollers 45 are each arranged at the respective end pivot points 41d to 41g'.

In the embodiment of the cable car carriage 10 shown in FIGS. 10 and 11, the spacing between the end pivot points 43a to 43g' of the balance beams 41a to 41g relative to the central pivot points 42a to 42g may be designed to be different in each stage. Particularly preferred, the balance beams 41a to 41n of a respective stage are constructed identically, with identical distances between the end pivot points 43 a to 43g' and the central pivot points 42a to 42g and identical dimensions of the individual balance beams 41a to 41g.

FIG. 12 shows an embodiment of the cable car carriage 10 according to the invention with a balance trolley when driving onto a cable saddle 200. The balance trolley 40, 140 enables, in particular when driving onto a cable saddle 200, equalization of the force distribution over all rollers 45 and 145, thereby mitigating or preventing shocks in the crawler running gear 12, 22 and significantly increasing the service life of the individual components of the crawlers 1, 2. Furthermore, the use of a balance trolley 40 enables a shock-free passage across a cable saddle 200.

Figure 13:
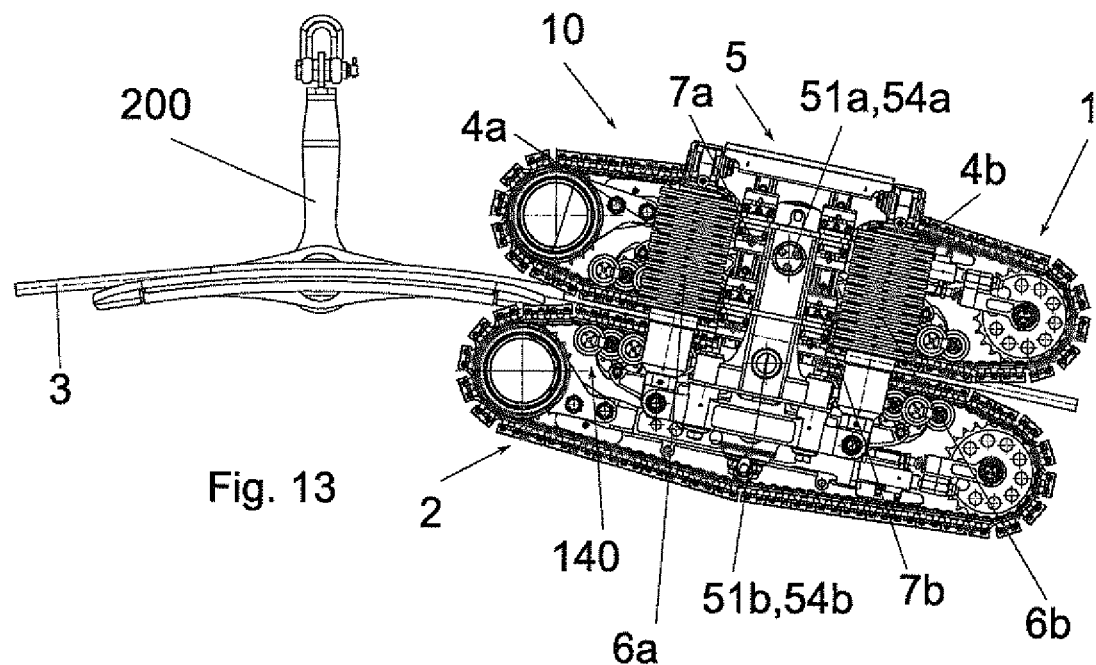
FIGS. 13 and 14 show in a frontal and a perspective view another embodiment of the cable car carriage with a balance trolley and pressing mechanism.
Figure 14:
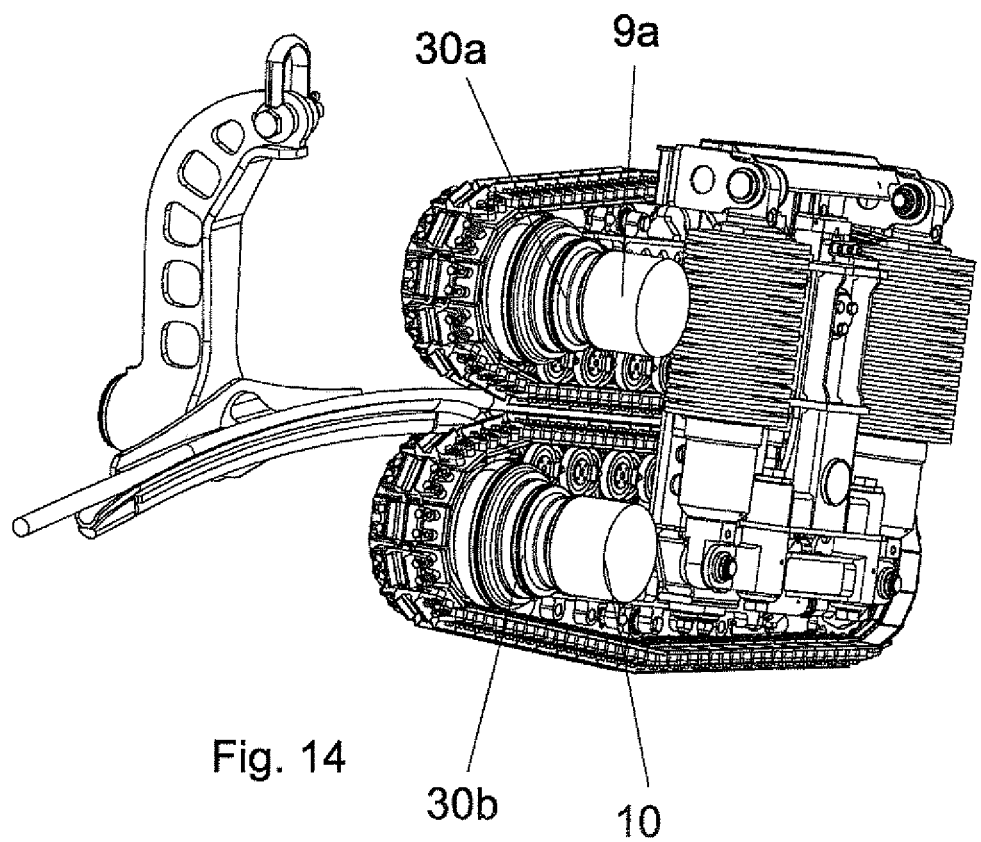

FIGS. 13 and 14 show a particularly preferred embodiment of the cable car carriage 10 according to the invention. The cable car carriage 10 includes an inventive balance trolley 40, 140, which is integrated in the respective crawlers 1 and 2, and an inventive pressing mechanism 5. The pressing mechanism 5 includes two spring tensioning elements 4a, 4b, which are each arranged concentrically around a biasing cylinder 6a, 6b. The biasing cylinder 6a and 6b, respectively, connects the first frame part 51 with the second frame part 52 of the pressing mechanism 5 and thus defines the pressing force of the crawlers 1, 2 against one another. The crawlers 1, 2 are rotatably arranged at the bearing points 51a and 51b and the bearing pins 54a, 54b. Furthermore, the pressing mechanism 5 of the cable car carriage 10 includes two pressure cylinders 7a, 7b which together with the biasing cylinders 6a, 6b and the spring tensioning elements 4a, 4b, respectively, determine the pressing force of the crawlers 1, 2 against the support cable 3.

FIG. 14 shows the cable car carriage 10 according to the invention of FIG. 13 in a perspective view. The crawler running gears 12, 22 of the crawlers 1, 2 are each driven by a sub-drive 30a, 30b, wherein in each case the sub-drive 30a, 30b of the crawler running gears 12, 22 drives a pinion or a deflection roller of the respective crawler running gear 12, 22. The sub-drives 30a, 30b further include brake mechanisms 9a, 9b capable of braking the respective sub-drives 30a, 30b or bring the cable car carriage 10 to a stop in an emergency.

Alternatively, as shown in FIGS. 1, 2 and 10 to 14, the crawler running gear 12, 22 of the first crawler 1 and of the second crawler 2 may include a respective clamping cylinder 13 and 23, which tensions the crawler chain 11 and the crawler chain 21 of the crawlers 1, 2. The clamping cylinders 13, 23 may also be connected, together with the biasing cylinders 6a, 6b or the biasing cylinder 6 and/or the pressure cylinder 7 or the pressure cylinders 7a, 7b, to the same hydraulic system and are supplied with an increasing supply pressure proportional to the drive power.

FIGS. 15 and 16 show a passenger gondola according to the invention for transporting passengers on a support cable 3. The passenger gondola 100 includes two cable car carriages 10a, 10b which are arranged one behind the other on the support cable 3. The passenger gondola 100 is connected with the cable car carriages 10a, 10b via a suspension 60 and connected to the first part of the respective cable car carriage 10a, 10b via a rotary joint 61a, 61b, which allows the position of the passenger gondola 100 to follow the direction of gravity, so that the passenger gondola 100 is always oriented in the direction of gravity. The cable car carriages 10a, 10b can be designed as shown in FIGS. 1 to 14.

According to another aspect of the present invention, suitable cable saddles 200 for a passage of cable car carriage 10 according to the invention are provided. An embodiment of a cable saddle 200 according to the invention is shown in FIGS. 17 to 19. The cable saddle 200 has a suspension 201, which is designed as an L-shaped cantilever. The suspension 201 has a first part 201a and a second part 201b, wherein the first part 201a is longer than the second part 201b. Two connecting elements 202a, 202b configured for attachment to a cable support or other support elements are arranged on the second part 201b. A cable support 203, which is pivotally mounted or rotatably mounted in the middle in relation to the suspension 201, is arranged on the first part 201a of the suspension 201. The cable support 203 has an elongated cable support surface 204, on which a support cable 3 can be placed. The cable support surface 204 is hereby formed by several leaf springs 205, which are arranged side by side are and elastically deformable in the direction of the cable support surface 204. The leaf springs 205 have the same length and are staggered side by side on the cable support 203.

As shown in FIG. 19, the leaf springs 205 and/or the cable support surface 204 may have cable enclosures 206 into which the cable or support cable 3 is inserted. The cable enclosures 206 can better prevent a change in position or a slippage of the support cable 3. The cable support surface 204 is formed by a slightly curved assembly of the leaf springs 205 to each other in the shape of an arc (FIG. 17), wherein the angle α of the curvature can be adjusted to the conditions of the cable run or the course of a support cable 3.

It is further provided that a cable car carriage 10 according to the invention or two or more cable car carriages 10a, 10b according to the invention are integrated in a cable crane for transporting cargo on a support cable 3, wherein the cable crane is suspended in particular on the cable car carriages 10a, 10b.

A further aspect of the invention relates to an assembly for transporting goods or passengers along a support cable 3, wherein the assembly includes one cable saddle 200 or a plurality of cable saddles 200, which are designed according to the cable saddles 200 according to the invention, as described by way of example in FIGS. 15 to 17 and which are attached to the supports at the respective suspension 201 via the connecting elements 202a, 202b. The assembly according to the invention further includes a support cable 3 which rests on the cable support surface 204 of the cable saddle 200 and which includes a passenger gondola 100 or a cable crane with a cable car carriage 10 according to the invention, as described in the exemplary embodiments depicted in FIGS. 1 to 14. The support cable 3 is hereby inserted between the opposing chain links 111, 211 of the crawler chains 11, 21 or the crawler chains 11, 21 of several cable car carriages 10a, 10b. The passenger gondolas 100 or the cable cranes can be moved along the support cable 3 by sub-drives 30a, 30b, so that passengers or goods in the passenger gondolas 100 or the cable cranes can be transported along the support cable 3.

In the described embodiments, the drive 30 or the sub-drives 30a, 30b may include internal combustion engines, electric motors or hydraulic motors.

As an alternative to a crew-operated or driver-controlled drive of the cable car carriage 10 of the passenger gondola or the cable crane, the drive 30, the hydraulic system and/or the control block may be controlled automatically or via a radio control, which allows the cable car carriage 10 to be moved on the support cable 3 with or without operator control.

Furthermore, the biasing cylinder 6 or the biasing cylinders 6a, 6b may be controlled via an intelligent control block. For this purpose, the biasing cylinder 6 or the biasing cylinders 6a, 6b may be connected to or include electrical pressure control valves which regulate the pressure in the biasing cylinder 6 or the biasing cylinders 6a, 6b and adapt the pressure to the conditions of movement of the cable car carriage 10. Preferably, one electric sensor may be provided per crawler 1, 2, which compare the respective slippage between the crawlers 1, 2 or the cable car carriages 10a, 10b by using software and evaluate them with a program filter. These additional electrical and hydraulic components make it possible to briefly independently increase the pressing force of the cable car carriage 10 or the cable car carriages 10a, 10b when the difference in slippage between the two crawlers 1, 2 is too high.

The invention claimed is:

1. A cable car carriage for transporting goods or passengers, comprising:
    two spaced-apart crawlers arranged in opposition to each other in a plane, with each of the crawlers having a plurality of consecutively arranged chain links forming a respective crawler chain, wherein opposing chain links of the respective crawler chains are constructed to accommodate a support cable inserted between the opposing crawlers,
    a pressing mechanism connecting the crawlers with each other and constructed to adjust the spacing between the crawlers and a pressing force of the two crawlers with respect to each other or the pressing force of the two crawlers against the support cable, and
    a drive driving the crawlers in a circular motion via a crawler running gear,
    wherein the cable car carriage is adjustable along the support cable,
    wherein the pressing mechanism comprises a first frame part and a second frame part, with at least one of the first frame part and the second frame part being adjustable along a center axis, wherein one of the two crawlers is arranged on the first frame part at a first bearing point, and another one of the two crawlers is arranged on the second frame part at a second bearing point, enabling the two crawlers to pivot relative to each other.

2. The cable car carriage of claim 1, wherein the pressing mechanism comprises at least one spring tensioning element which biases the two crawlers toward each other via the first frame part and the second frame part, and at least one biasing cylinder, which counteracts a force of the at least one spring tensioning element.

3. The cable car carriage of claim 2, comprising two spring tensioning elements, two biasing cylinders and two pressure cylinders, which are integrated in the pressing mechanism and arranged on the cable car carriage on a longitudinal side of the two crawlers symmetrically about a center axis.

4. The cable car carriage of claim 2, further comprising a pressure regulator controlling a pressure in the at least one biasing cylinder in proportion to a power of the drive, wherein a travel pressure is applied in the at least one biasing cylinder at the beginning of a movement of the cable car carriage along the support cable, wherein a force effect of the at least one biasing cylinder cancels a force effect of the at least one spring tensioning element in the presence of the travel pressure.

5. The cable car carriage of claim 4, wherein the force effect of the at least one biasing cylinder is limited by a mechanical stop or by a maximum stroke of the biasing cylinder, wherein the force effect of the at least one biasing cylinder is prevented from increasing in the presence of the travel pressure.

6. The cable car carriage of claim 2, wherein the at least one spring tensioning element comprises disc springs arranged concentrically around the at least one biasing cylinder.

7. The cable car carriage of claim 1, wherein the pressing mechanism comprises at least one pressure cylinder arranged between the first frame part and the second frame part, connecting the first frame part and the second frame part with one another, and constructed to press the crawlers against each other with a predetermined pressure.

8. The cable car carriage of claim 7, wherein the at least one pressure cylinder and a biasing cylinder are each connected to a common hydraulic system having a supply pressure, wherein the at least one pressure cylinder and the biasing cylinder are designed and arranged such that a force effect of the at least one pressure cylinders and a force effect of the biasing cylinder operate on the pressing mechanism in opposite directions with equal magnitude up to a maximum supply pressure, in particular a maximum supply pressure of 90 bar, thereby canceling each other.

9. The cable car carriage of claim 1, wherein the drive of the crawlers comprises a combustion engine or an electric motor.

10. The cable car carriage of claim 1, wherein the chain links accommodate at least a portion of the cross section of the support cable, with the chain links of one of the two crawlers accommodating more than half the cross section of the support cable.

11. The cable car carriage of claim 1, further comprising a gondola arranged on the cable car carriage for transporting passengers or cargo, and a connecting arm connected to the first frame part of the pressing mechanism and pivotally supporting the gondola.

12. The cable car carriage of claim 1, wherein the crawler running gear comprises a balance trolley having a plurality of balance beams cascaded in a plurality of stages for uniform force distribution in the crawler running gear, wherein each balance beam has a central pivot point and two end pivot points arranged equidistant from the central pivot point and proximate to a respective end of each balance beam, wherein the central pivot point of the balance beam of a first stage is articulated on the pressing mechanism for pivoting about the first bearing point or the second bearing point, wherein the central pivot points of the balance beams of a second stage are arranged at the end pivot points of the balance beam of the first stage, and wherein a respective balance beam of the third stage with its central pivot point is articulated at the end pivot points of the balance beams of the second stage, etc., wherein a plurality of rollers is arranged on and supported for rotation about the end pivot points of the balance beams of a last-stage, and wherein the plurality of rollers can be urged against a respective crawler chain on at least one chain link.

13. The cable car carriage of claim 12, wherein the end pivot points of each of the plurality of balance beams are spaced from a central pivot point of the respective balance beam along the height, with connecting lines between the end pivot points and the central pivot point forming an isosceles triangle, with the isosceles triangles in the individual stages being congruent.

14. The cable car carriage of claim 12, wherein the balance trolley has a plurality of balance beams arranged in three stages, wherein the end pivot points of each of the plurality of balance beams are spaced from a central pivot point of the respective balance beam along the height, with connecting lines between the end pivot points and the central pivot point forming an isosceles triangle.

15. The cable car carriage of claim 12, wherein two respective balance beams are articulated at each end pivot of each stage, wherein the respective two balance beams are each arranged symmetrically on one side of the balance beam of a previous stage.

16. A cable car carriage for transporting goods or passengers, comprising:

two spaced-apart crawlers arranged in opposition to each other in a plane, with each of the crawlers having a plurality of consecutively arranged chain links forming a respective crawler chain, wherein opposing chain links of the respective crawler chains are constructed to accommodate a support cable inserted between the opposing crawlers, a pressing mechanism connecting the crawlers with each other and constructed to adjust the spacing between the crawlers and a pressing force of the two crawlers with respect to each other or the pressing force of the two crawlers against the support cable, and a drive driving the crawlers in a circular motion via a crawler running gear, wherein the cable car carriage is adjustable along the support cable, wherein each crawler comprises at least one clamping cylinder which is arranged parallel to opposing chain links of the two crawler chains and tensions the respective crawler chain.

17. The cable car carriage of claim 16, wherein a biasing cylinder, a pressure cylinder or the at least one clamping cylinder are oleo-dynamic hydraulic cylinders connected to a common hydraulic system having identical supply pressure throughout the common hydraulic system.

18. The cable car carriage of claim 17, wherein a supply pressure of the biasing cylinder, the pressure cylinder or the at least one clamping cylinder is regulated in proportion to a power of the drive, with the drive feeding the hydraulic system and setting a pressure and flow in the hydraulic system.

19. The cable car carriage of claim 16, further comprising an intelligent control block and pressure control valves connected to a biasing cylinder, a pressure cylinder or to the at least one clamping cylinder, with the pressure control valves constructed to adjust a pressure in the biasing cylinder, in the pressure cylinder or in the at least one clamping cylinder when the control block determines slippage of one or both crawlers or slippage between the crawlers.

20. A cable car carriage for transporting goods or passengers, comprising:

two spaced-apart crawlers arranged in opposition to each other in a plane, with each of the crawlers having a plurality of consecutively arranged chain links forming a respective crawler chain, wherein opposing chain links of the respective crawler chains are constructed to accommodate a support cable inserted between the opposing crawlers, a pressing mechanism connecting the crawlers with each other and constructed to adjust the spacing between the crawlers and a pressing force of the two crawlers with respect to each other or the pressing force of the two crawlers against the support cable, and a drive driving the crawlers in a circular motion via a crawler running gear, wherein the cable car carriage is adjustable along the support cable, wherein each crawler or crawler chain is driven directly by a respective hydraulic motor, wherein the hydraulic motors are constructed identically and supplied identically by a hydraulic system.

21. A cable car carriage for transporting goods or passengers, comprising:

two spaced-apart crawlers arranged in opposition to each other in a plane, with each of the crawlers having a plurality of consecutively arranged chain links forming a respective crawler chain, wherein opposing chain links of the respective crawler chains are constructed to accommodate a support cable inserted between the opposing crawlers, a pressing mechanism connecting the crawlers with each other and constructed to adjust the spacing between the crawlers and a pressing force of the two crawlers with respect to each other or the pressing force of the two crawlers against the support cable, and a drive driving the crawlers in a circular motion via a crawler running gear, said drive being controlled via radio control, wherein the cable car carriage is adjustable along the support cable.

22. A cable car carriage for transporting goods or passengers, comprising:

two spaced-apart crawlers arranged in opposition to each other in a plane, with each of the crawlers having a plurality of consecutively arranged chain links forming a respective crawler chain, wherein opposing chain links of the respective crawler chains are constructed to accommodate a support cable inserted between the opposing crawlers, a pressing mechanism connecting the crawlers with each other and constructed to adjust the spacing between the crawlers and a pressing force of the two crawlers with resect to each other or the pressing force of the two crawlers against the support cable, and a drive driving the crawlers in a circular motion via a crawler running gear, said drive comprising a brake mechanism having disc springs for braking the drive, wherein the cable car carriage is adjustable along the support cable.

23. A cable car carriage for transporting goods or passengers, comprising:

two spaced-apart crawlers arranged in opposition to each other in a plane, with each of the crawlers having a plurality of consecutively arranged chain links forming a respective crawler chain, wherein opposing chain links of the respective crawler chains are constructed to accommodate a support cable inserted between the opposing crawlers, a pressing mechanism connecting the crawlers with each other and constructed to adjust the spacing between the crawlers and a pressing force of the two crawlers with respect to each other or the pressing force of the two crawlers against the support cable, and a drive driving the crawlers in a circular motion via a crawler running gear, wherein the cable car carriage is adjustable along the support cable, and wherein each crawler has a dedicated drive driving a respective crawler running gear, and a dedicated brake mechanism.

24. A cable saddle, comprising a suspension, a cable support arranged on the suspension for supporting a support cable, and at least one connecting element arranged on the suspension for attachment to a pylon, wherein the cable support has an elongated cable support surface onto which the support cable can be placed, with the cable support surface having a plurality of springy sections which are elastically bendable predominantly normal to the cable support surface wherein the cable saddle is constructed to be traversed by a cable car carriage which comprises two spaced-apart crawlers arranged in opposition to each other in a plane, with each of the crawlers having a plurality of consecutively arranged chain links form a crawler chain, wherein opposing chain links of the crawler chains are constructed to accommodate the support cable inserted between the opposing crawlers a pressing mechanism connecting the crawlers with each other and constructed to adjust the spacing between the crawlers and to adjust a pressing force of the two crawlers with respect to each other or the pressing force of the two crawlers against the support cable; and a drive driving the crawlers in a circular motion via a crawler running gear wherein the cable support comprises a plurality of leaf springs arranged side by side, which are elastically deformable relative to one another and form the cable support surface.

25. A cable saddle, comprising a suspension a cable support arranged on the suspension for supporting a support cable, and at least one connecting element arranged on the suspension for attachment to a pylon, wherein the cable support has an elongated cable support surface onto which the support cable can be placed, with the cable support surface having a plurality of springy sections which are elastically bendable predominantly normal to the cable support surface wherein the cable saddle is constructed to be traversed by a cable car carriage which comprises two spaced-apart crawlers arranged in opposition to each other in a plane, with each of the crawlers having a plurality of consecutively arranged chain links form a crawler chain, wherein opposing chain links of the crawler chains are constructed to accommodate the support cable inserted between the opposing crawlers; a pressing mechanism connecting the crawlers with each other and constructed to adjust the spacing between the crawlers and to adjust a pressing force of the two crawlers with respect to each other or the pressing force of the two crawlers against the support cable; and a drive driving the crawlers in a circular motion via a crawler running gear, wherein the suspension is formed as an L-shaped cantilever having a first part and a second part which is longer than the first part, wherein the at least one connecting element is arranged on the second part and the cable support is rotatably mounted on the first part.

26. A cable saddle, comprising a suspension, a cable support arranged on the suspension for supporting a support cable, and at least one connecting element arranged on the suspension for attachment to a pylon, wherein the cable support has an elongated cable support surface onto which the support cable can be placed, with the cable support surface having a plurality of springy sections which are elastically bendable predominantly normal to the cable support surface, wherein the cable saddle is constructed to be traversed by a cable car carriage which comprises two spaced-apart crawlers arranged in opposition to each other in a plane, with each of the crawlers having a plurality of consecutively arranged chain links form a crawler chain, wherein opposing chain links of the crawler chains are constructed to accommodate the support cable inserted between the opposing crawlers; a pressing mechanism connecting the crawlers with each other and constructed to adjust the spacing between the crawlers and to adjust a pressing force of the two crawlers with respect to each other or the pressing force of the two crawlers against the support cable; and a drive driving the crawlers in a circular motion via a crawler running gear, wherein the elongated cable support surface forms a curved plane.

* * * * *